US00RE35009E

United States Patent [19]

Bugnon et al.

[11] E Patent Number: Re. 35,009

[45] Reissued Date of Patent: Aug. 1, 1995

[54] DIKETOPYRROLOPYRROLE PIGMENTS IN PLATELET FORM

[75] Inventors: Philippe Bugnon, Essert; Fritz Herren, Düdingen; Bernhard Medinger, Giffers, all of Switzerland

[73] Assignee: Ciba-Geigy Corporation, Ardsley, N.Y.

[21] Appl. No.: 145,706

[22] Filed: Oct. 28, 1993

Related U.S. Patent Documents

Reissue of:

[64] Patent No.: 5,095,122
Issued: Mar. 10, 1992
Appl. No.: 552,626
Filed: Jul. 13, 1990

[30] Foreign Application Priority Data

Jul. 13, 1989 [CH] Switzerland ..... 2630/89

[51] Int. Cl.[6] ..... C07D 487/04; C09B 67/20; D06P 1/64

[52] U.S. Cl. ..... 548/453; 534/575; 544/300

[58] Field of Search ..... 548/453; 544/300; 534/575

[56] References Cited

U.S. PATENT DOCUMENTS

| | | | |
|---|---|---|---|
| 1,891,891 | 12/1932 | Luft et al. | 534/887 X |
| 2,176,011 | 9/1938 | Murch et al. | 534/887 X |
| 2,278,973 | 6/1939 | Carr | 534/887 X |
| 2,402,167 | 12/1942 | Lang et al. | 534/887 X |
| 2,441,800 | 10/1942 | Degering et al. | 534/887 X |
| 2,564,225 | 8/1951 | Mayers | 534/887 X |
| 2,574,597 | 11/1951 | Salvin et al. | 534/887 X |
| 2,611,771 | 9/1952 | Marnon | 534/887 X |
| 2,755,195 | 7/1956 | Grubenmann | 534/887 X |
| 2,816,114 | 12/1957 | Ehrich et al. | 534/887 X |
| 2,849,329 | 8/1958 | Braun | 534/887 X |
| 2,893,994 | 7/1959 | Helfaer et al. | 534/887 X |
| 2,912,428 | 11/1959 | Gaertner et al. | 534/887 X |
| 2,930,792 | 3/1960 | Fleysher | 534/887 X |
| 3,016,384 | 1/1962 | Caliezi | 534/887 X |
| 3,071,815 | 1/1963 | MacKinnon | 534/887 X |
| 3,127,412 | 3/1964 | Gaertner et al. | 534/887 X |
| 3,137,686 | 6/1964 | Dietz et al. | 534/887 X |
| 3,356,443 | 12/1967 | Dziomba | 534/887 X |
| 3,681,374 | 8/1972 | Yano et al. | 548/265.2 X |
| 3,804,824 | 4/1974 | Kaiser et al. | 534/887 X |
| 4,117,066 | 9/1978 | Mollet et al. | 534/887 X |
| 4,195,020 | 3/1980 | Hunger et al. | 534/742 |
| 4,206,114 | 6/1980 | Roneche | 534/742 |
| 4,341,701 | 7/1982 | Pechey et al. | 534/887 X |
| 4,370,270 | 1/1983 | Bock et al. | 540/141 |
| 4,451,654 | 5/1984 | Graser et al. | 534/887 X |
| 4,560,747 | 12/1985 | Bruttel et al. | 534/887 X |
| 4,801,702 | 1/1989 | Bäbler | 534/887 X |
| 4,876,333 | 10/1989 | Huehener et al. | 534/575 |
| 4,916,216 | 4/1990 | Tanaka et al. | 534/887 X |
| 5,084,573 | 1/1992 | Bäbler et al. | 546/56 |
| 5,374,014 | 9/1994 | Babler | 548/453 |

FOREIGN PATENT DOCUMENTS

| | | |
|---|---|---|
| 1169053 | 6/1984 | Canada . |
| 142746 | 10/1930 | Switzerland . |

OTHER PUBLICATIONS

Ullmans Encyclopedia der Techn. Chemie 13, p. 742, Third Ed., 1962.

K. Dorfner E. Merck, "Pearl Lustre Pigments", Specialty Chemicals 2 & 3, Feb. & May 1982.

Patent Abstracts of Japan, Abstract of JP 57-51733, Jul. 1982.

*Primary Examiner*—Mary C. Lee
*Assistant Examiner*—Fiona T. Powers
*Attorney, Agent, or Firm*—Michele A. Kovaleski

[57] ABSTRACT

Organic pigments selected from the diketopyrrolopyrrole, azo, isoindolinone and isoindoline series, which pigments consist of *at least* 50% by weight of platelets which are from 5 to 50 μm long, 2 to 50 μm wide and 0.01 to 5 μm thick, with the proviso that the ratios of length:thickness and width:thickness must be at least 3.

The pigments in platelet form are excellently suited to producing effect colorations in high molecular weight organic material and in cosmetic products.

4 Claims, No Drawings

DIKETOPYRROLOPYRROLE PIGMENTS IN PLATELET FORM

Matter enclosed in heavy brackets [ ] appears in the original patent but forms no part of this reissue specification; matter printed in italics indicates the additions made by reissue.

The present invention relates to organic effect pigments in platelet form of specific pigment classes and to the use thereof for producing effect finishes.

It is common knowledge in the art of pigments and has often been reported in the relevant literature that the particle size of a pigment must be below a certain limit in order that the pigment may meet the colouristic requirements made of it. The usual particle size is in the range from ca. 0.1 to 1.0 μm (q.v. Ullmanns Encyclopädie der technischen Chemie, Vol. 13, page 742, 3rd edition, 1962). It is, however, also known that the so-called effect or pearl lustre pigments consist of quite large platelet-shaped particles. Formerly, the pearl lustre effect was obtained with natural fish-silver, i.e. with guanin dispersions obtainable from fish scales. At the present time, the pearl lustre pigments normally consist of inorganic particles in platelet form which may be coated with coloured oxide layers (q.v. K. Dorfner, E. Merck, "Pearl Lustre Pigments", Speciality Chemicals 2 and 3, February and May 1982). These pigments, however, do not meet present-day colouristic standards in all respects. The sole exception so far is an organic pigment in platelet form disclosed as pearl lustre pigment in U.S. Pat. No. 4,370,270. This pigment is a copper phthalocyanine of the β-modification which is synthesised in the form of flakes of at least 10 μm in length and 3 μm in width. When incorporated in stoving varnishes, this pigment gives metal effect finishes.

Surprisingly, it has now been found that it is also possible to obtain a platelet-shaped form of compounds of other specific organic pigment classes for producing effect finishes by subjecting them to recrystallisation in solvents in which they are to a certain degree soluble.

Accordingly, the present invention relates to organic pigments selected from the diketopyrrolopyrrole, azo, isoindolinone and isoindoline series, which pigments consist of *at least* 50% by weight of platelets which are from 5 to 50 μm long, 2 to 50 μm wide and 0.01 to 5 μm thick, with the proviso that the ratios of length:thickness and width:thickness must be at least 3, preferably at least 5.

The pigments preferably consist at least of 70% by weight of platelets of the order of magnitude specified above.

Preferred pigments in the platelet form of this invention are 1,4-diketopyrrolo-[3,4-c]pyrrole pigments, most preferably 1,4-diketo-3,6-diphenylpyrrolo[3,4-c]pyrrole.

The pigments in platelet form of this invention are obtained from the crude pigments or the appropriate pigment forms by recrystallisation in an organic solvent or mixture of solvents, with or without water, in which 0.5 to 10% by weight, preferably 0.1 to 5% by weight, of the pigment is soluble under the conditions of recrystallisation, i.e. normally in the temperature range from 50° C. to the boiling point of the solvent, or also above the boiling point of the solvent, under pressure, in the absence or presence of a solubiliser, for example an organic or, preferably, inorganic base such as aqueous sodium hydroxide, aqueous potassium hydroxide or pyridine, or also an acid such as sulfuric acid.

Examples of suitable solvents are aromatic solvents such as toluene, xylene, o-dichlorobenzene, nitrobenzene and, more particularly, polar solvents such as dimethyl formamide, N-methylpyrrolidone, hexamethylphosphoric triamide, sulfolane, dimethyl sulfoxide and dimethyl sulfone, or mixtures thereof.

Conveniently 1 to 20% by weight, preferably 3 to 15% by weight, of the pigment, based on the solvent or solvent mixture, is recrystallised for at least 30 minutes, with cautious stirring, in said solvent or solvent mixture. The duration of the recrystallisation will depend on the desired size of the platelets.

The pigments which afford the pigments in platelet form by the above described recrystallisation process are those generally known to persons skilled in the art.

The pigments in platelet form of this invention are preeminently suitable for producing effect finishes, for example pearl lustre or metal lustre finishes, in organic material of high molecular weight and in cosmetic products. For this utility they may be used by themselves or in conjunction with other organic or inorganic, opaque or transparent pigments and/or with other effect pigments. They make it possible to produce novel colouristic and hitherto non-adjustable effect finishes of excellent fastness properties.

Examples of high molecular weight organic materials which may be coloured or pigmented with the pigments in platelet form of this invention are cellulose ethers and estes such as ethyl cellulose, nitrocellulose, cellulose acetate or cellulose butyrate, natural resins or synthetic resins such as polymerisation resins or condensation resins, for example aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyesters, ABS, polyphenylene oxides, rubbers, casein, silicone and silicone resins, singly or in admixture.

The above high molecular weight materials may be singly or as mixtures in the form of plastics, melts or of spinning solutions, paints, coating compositions or printing inks.

The pigments in platelet form of this invention are preferably used in lacquers, especially in automotive lacquers, in the 1- 2- or 3-layer systems applied at the present time for producing metal effect finishes, for example polyester/melamine or acrylate/melamine basic lacquers which are oversprayed with acrylate/-melamine clear lacquers. For this utility it is also possible to use in place of solvent-based basic lacquers those containing water as solvent. Further suitable binders are, typically, alkyd resins (non-baking and baking) as well as 2-K lacquers derived from hydroxyl-containing polyesters or acrylates and isocyanates. For use in 3-layer systems, the bottom-most layer may also contain opaque organic or inorganic pigments. In such systems, the pigments in platelet form of this invention may be used in accordance with the methods described in U.S. Pat. No. 4,539,258. In other respects, the modifiers conventionally employed in all the fields of use referred to above, for example plasticisers, waxes and the like, are used.

The lacquers, printing inks, plastics materials and the like are conveniently coloured with the pigments of this invention by cautiously stirring and homogenising the pigments in platelet form in the appropriate media with the aid of dissolvers, impellers or similar apparatus. Intensive dispersion or grinding with balls or other dispersion aggregates must be avoided, as there is otherwise the danger that the platelets will be destroyed by such methods and the colouristic effects lost.

The pigments in platelet form can be added to the high molecular weight organic material in an amount of 0.01 to 30% by weight, preferably of 0.1 to 10% by weight, based on said material.

Cosmetic products which can be coloured with the pigments in platelet form of this invention for achieving effect colourations are, for example, eye make-up products such as compact powder, eye-shadow emulsions, mascara products and, in particular, nail varnishes. The pigments in platelet form of this invention can be added to the cosmetic product in an amount of 0.5 to 2% by weight, based on said product.

The invention is illustrated by the following Examples.

EXAMPLE 1

With cautious stirring, 1 g of 1,4-diketo-3,6-diphenylpyrrolo[3,4-c]pyrrole is recrystallised in 50 ml of N-methylpyrrolidone for 6 hours at 180° C. After 1 hour, the formation of fine platelets can be observed in the suspension. Afterwards the suspension is cooled and filtered. The filter product is washed in succession with N-methylpyrrolidone, ethanol and water, and dried in a vacuum drier.

A red pigment in platelet form is obtained. At least 50% of the platelets are 5 to 50 μm long, 2 to 50 μm wide, and 0.1 to 5 μm thick.

EXAMPLE 2

With cautious stirring, 20 g of 1,4-diketo-3,6-diphenylpyrrolo[3,4-c]pyrrole are recrystallised in 600 ml of dimethyl formamide for 4 hours at 150° C. Afterwards the suspension is cooled and filtered. The filter product is washed in succession with dimethyl formamide and water, and dried in a vacuum drier. A red pigment in platelet form is obtained. At least 70% of the platelets are 10 to 30 μm long, 3 to 30 μm wide, and 0.1 to 4 μm thick.

EXAMPLE 3

4 g of the azo pigment, C.I. Pigment Yellow 154, are recrystallised in 100 ml of dimethyl formamide for 4 hours at 110° C. Afterwards the suspension is cooled and filtered. The filter product is washed in succession with dimethyl formamide and water, and dried in a vacuum drier. A yellow pigment in platelet form is obtained.

EXAMPLE 4

2 g of the azo pigment, C.I. Pigment Yellow 74, are recrystallised in 100 ml of dimethyl formamide for 2 hours at 60° C. Afterwards the suspension is cooled and filtered. The filter product is washed in succession with dimethyl formamide and water, and the filter product is dried in a vacuum drier. A yellow pigment in platelet form is obtained.

EXAMPLE 5

With cautious stirring, 2 g of 1,4-diketo-3,6-diphenylpyrrolo[3,4-c]pyrrole is recrystallised in 100 ml of N-methylpyrrolidone for 24 hours at 120° C. Afterwards the suspension is cooled to 50° C. and 150 g of water are added. The suspension is stirred for a few minutes, then cooled and filtered. The filter product is washed with water and dried in a vacuum drier. A red pigment in platelet form is obtained.

EXAMPLE 6

2 g of 1,4-diketo-3,6-diphenylpyrrolo[3,4-c]pyrrole is recrystallised in 100 ml of dimethyl formamide for 23 hours at 180° C. Afterwards the suspension is cooled and filtered. The filter product is washed in succession with 50 ml of dimethyl formamide, 50 ml of isopropanol and copiously with water, and dried in a vacuum drier. A red pigment in platelet form is obtained.

EXAMPLE 7

6 g of an orange isoindoline pigment of formula

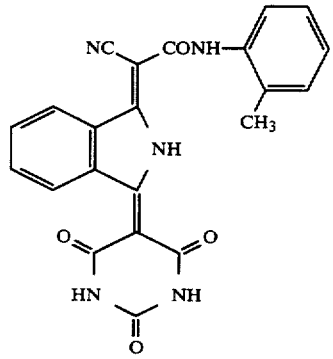

(Example 51 of U.S. Pat. No. 4,262,120) are recrystallised in 100 ml of dimethyl formamide for 19 hours at 180° C. in the presence of 0.22 g of a 30% solution of NaOH. An orange pigment in platelet form is obtained.

EXAMPLE 8

With cautious stirring, 15 g of 1,4-diketo-3,6-diphenylpyrrolo[3,4-c]pyrrole is recrystallised in 100 ml of dimethyl formamide for 4 hours at 150° C. Afterwards the suspension is cooled to 50° C. and 150 g of water are added. The suspension is stirred for a few minutes, then cooled and filtered. The filter product is washed with water and dried in a vacuum drier. A red pigment in platelet form is obtained.

EXAMPLE 9

2 g of an orange isoindoline pigment according to Example 7 are recrystallised in 100 ml of o-dichlorobenzene for 24 hours at 175° C. in the presence of 0.2 g of a 30% solution of NaOH. Afterwards the suspension is cooled and filtered. The filter product is washed in succession with methanol and water, and dried in a vacuum drier. An orange pigment in platelet form is obtained. At least 50% of the platelets are 2 to 20 μm long, 2 to 12 μm wide, and 0.1 to 1 μm thick.

EXAMPLE 10

32 g of the pigment obtained according to Example 2 are stirred for 1 hour with a toothed disc stirrer at 200 rpm into a 8.2% solution of 86 g of cellulose acetobutyrate (25% in butyl acetate), 4 g of zirconium octoate, 48 g of Solvesso 150® (aromatic solvent), 70 g of butyl acetate and 52 g of xylene.

Then 96 g of polyester resin Dynapol H700® (60%) and 12 g of melamine resin Maprenal MF650® (55%) are mixed with the above pigment dispersion to form a lacquer, which is applied with a spray gun. After the coating has dried briefly in the air, a clear lacquer based on a heat-curable acrylic lacquer is applied and baked for 30 minutes at 130° C. A red finish with a pronounced metallic effect is obtained.

EXAMPLE 11

500 g of the pigment obtained according to Example 2 are stirred for 30 minutes with a toothed disc stirrer at 250 rpm into 15 g of a nail varnish comprising 71.7 g of alkyd resin, Alkydal F681 ®, 21.7 g of sanga oil (petroleum fraction 140°-190° C.), 1.08 g of binder Exkin 2 ®, 1.08 g of Silicone oil A ® (1% in xylene) and 4.36 g of a drying agent solution (6.4 g of Co naphthenate 8%, 37.2 g of Pb naphthenate 24% and 56.4 g of Ca naphthenate 4%). The mill base is applied with an automatic coater to Mylar PR Film ® (200 μm wet film thickness). After drying, a red finish with a marked pearlescent effect is obtained.

EXAMPLE 12

200 g of the pigment obtained according to Example 2 are blended with 13.3 g of polyvinyl chloride and 7.3 g of dioctyl phthalate, and the mixture is processed for 5 minutes at 145° C. to a thin film on a roll mill. The colouration so obtained has a marked metallic effect.

What is claimed is:

1. A diketopyrrolopyrrole organic pigment, which consists of *at least* 50% by weight of platelets which are from 5 to 50 μm long, 2 to 50 μm wide and 0.01 to 5 μm thick, with the proviso that the ratios of length:thickness and width:thickness must be at least 3.

2. An organic pigment according to claim 1, wherein the ratios of length:thickness and width:thickness must be at least 5.

3. An organic pigment according to claim 1 which is a 1,4-diketopyrrolo[3,4-c]pyrrole pigment.

4. An organic pigment according to claim 1 which is 1,4-diketo-3,6-diphenylpyrrolo-[3,4-c]pyrrole.

* * * * *